W. H. PARKER.
TOOTHPICK MACHINE.
APPLICATION FILED SEPT. 27, 1911.
1,035,897.
Patented Aug. 20, 1912.
4 SHEETS—SHEET 1.
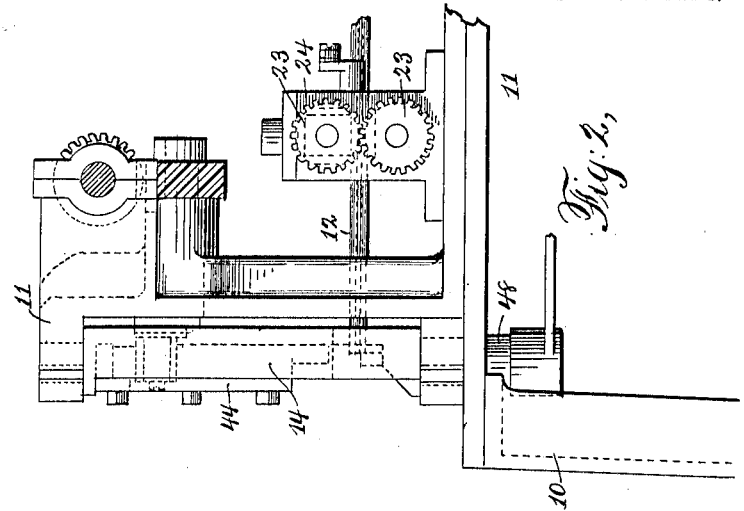
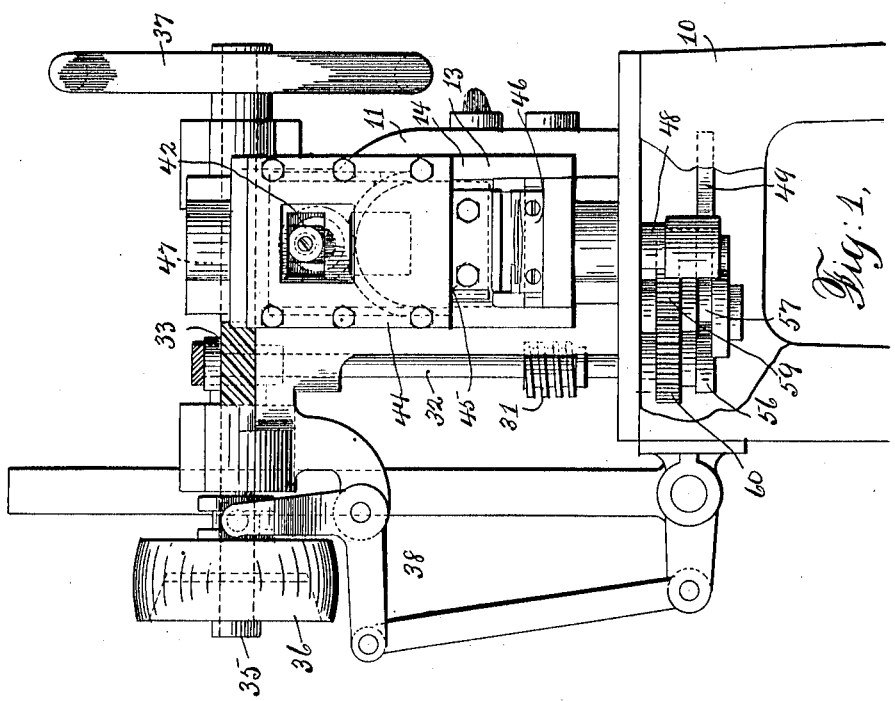

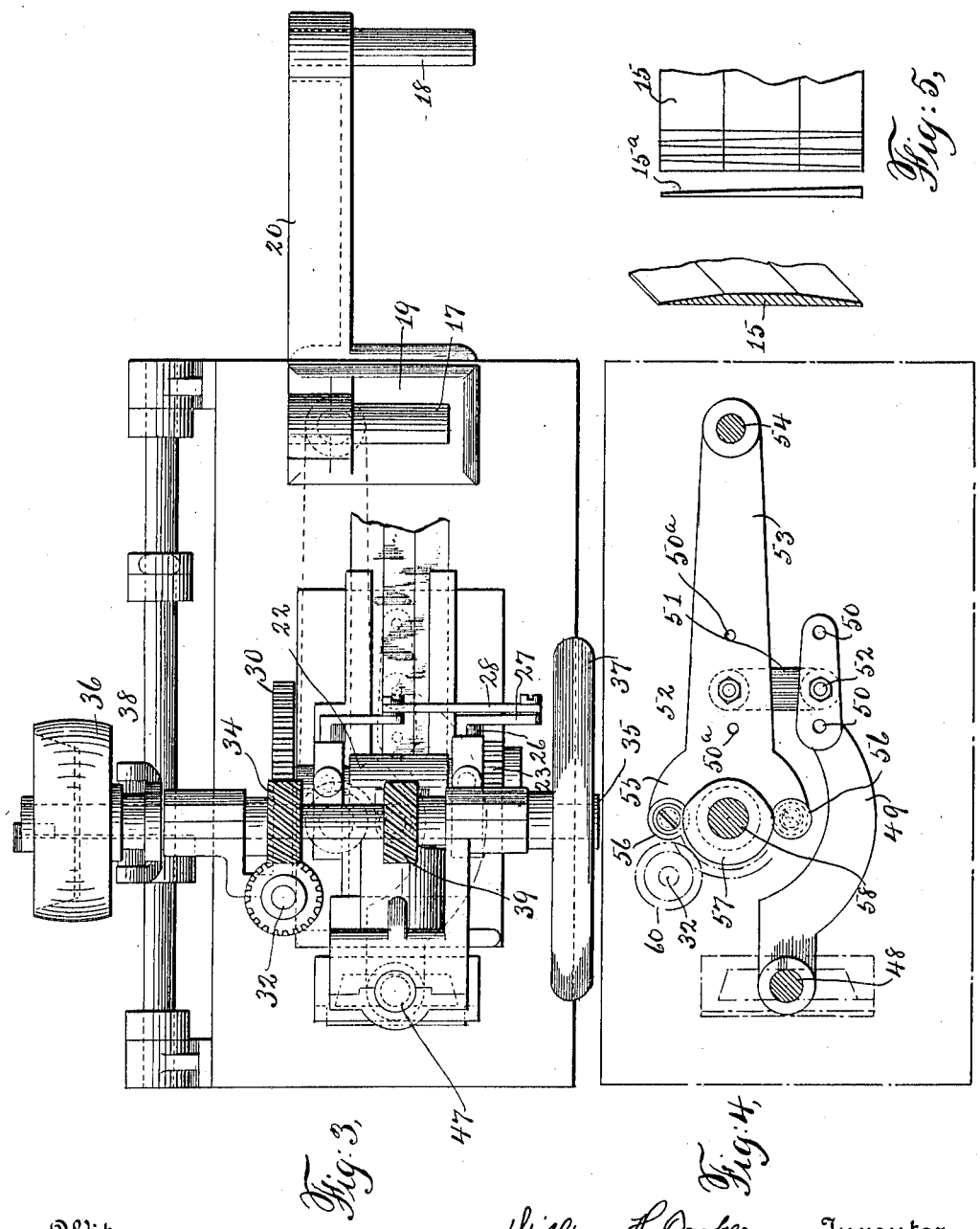

W. H. PARKER.
TOOTHPICK MACHINE.
APPLICATION FILED SEPT. 27, 1911.
1,035,897.
Patented Aug. 20, 1912.
4 SHEETS—SHEET 3.
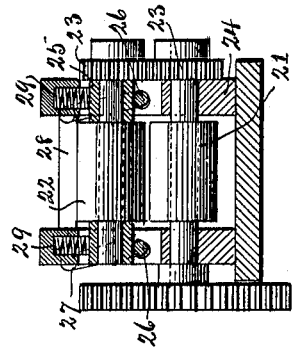
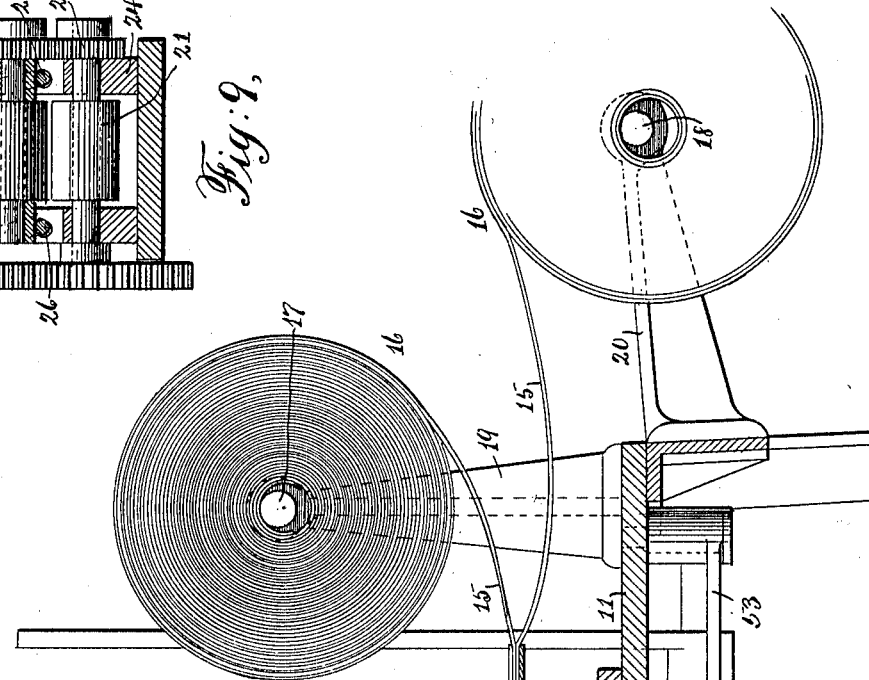
Witnesses:
Arthur S. Damrell,
Thomas T. Seelye.
William H. Parker, Inventor.
By his Attorney,
W. B. Hutchinson.

W. H. PARKER.
TOOTHPICK MACHINE.
APPLICATION FILED SEPT. 27, 1911.
1,035,897.
Patented Aug. 20, 1912.
4 SHEETS—SHEET 4.
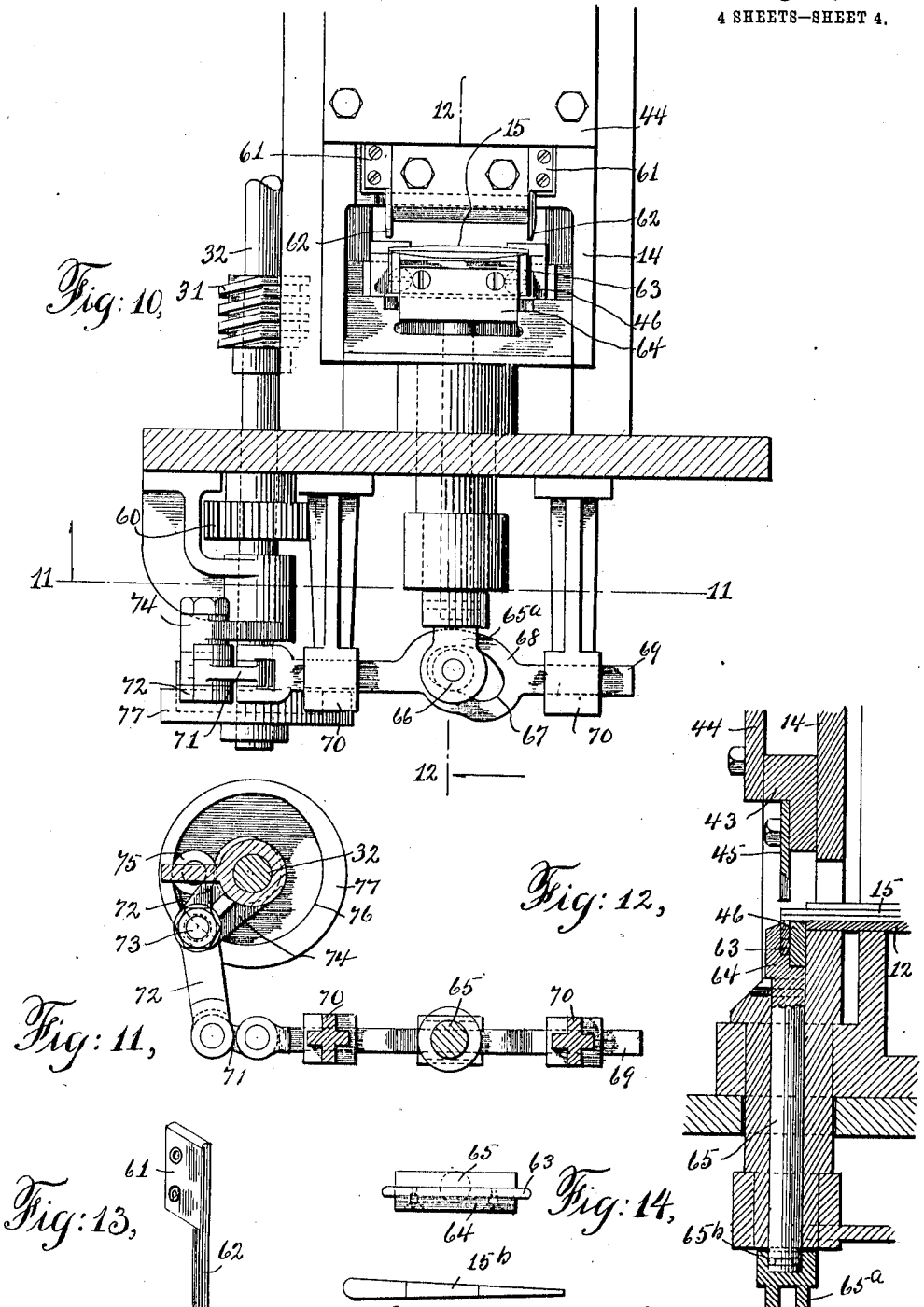

UNITED STATES PATENT OFFICE.

WILLIAM H. PARKER, OF STEILACOOM, WASHINGTON.

TOOTHPICK-MACHINE.

1,035,897.  Specification of Letters Patent.  Patented Aug. 20, 1912.

Application filed September 27, 1911. Serial No. 651,620.

*To all whom it may concern:*

Be it known that I, WILLIAM H. PARKER, of Steilacoom, Pierce county, State of Washington, have invented a new and useful Improvement in Toothpick-Machines, of which the following is a full, clear, and exact description.

My invention relates to improvements in tooth pick machines such as cut tooth picks from long strips of veneer, the width of the strip corresponding to the length of the tooth pick.

The object of my invention is to improve the construction of tooth pick machines of the so-called chopper type which have a reciprocating knife cutting transversely across the stock.

More particularly the object of my invention is to produce a simpler form of machine which will cut better picks than the ordinary tooth pick machine and which also will cut them very rapidly, and which is adapted to make a particularly good pick.

The invention is also intended to produce a machine which can be run regularly without getting out of order.

Reference is to be had to the accompanying drawings forming a part of this specification, in which similar reference characters refer to similar parts throughout the several views.

Figure 1 is a broken front elevation of the machine embodied in my invention. Fig. 2 is a broken side elevation with parts removed. Fig. 3 is a plan view of the machine. Fig. 4 is a sectional plan showing in detail the means for oscillating the head of the machine. Fig. 5 is a detail showing the character of the stock and the shape of the cut tooth pick. Fig. 6 is a vertical longitudinal section of the machine. Fig. 7 is a detail on the line 7—7 of Fig. 6. Fig. 8 is a detail section on the line 8—8 of Fig. 6. Fig. 9 is a cross section on the line 9—9 of Fig. 6, showing the stock feed in detail. Fig. 10 is a broken front elevation showing modification which adapts the machine to cutting tooth picks of another kind. Fig. 11 is a detail section on the line 11—11 Fig. 10. Fig. 12 is a vertical section on the line 12—12 of Fig. 10. Fig. 13 is a detail of one of the knives for shaping the tooth pick ends. Fig. 14 is a detail of the die used in the modified form; and Fig. 15 shows the style of tooth pick cut by the machine with the attachments shown in Figs. 10 to 12.

The machine has a suitable frame 10, preferably in the form of a table, on which is a top frame 11, and the stock is fed through the top frame in a generally horizontal direction by means of the feed chute 12 which delivers into the opening 13 of the head 14, which carries the cutting mechanism and which oscillates in the manner hereinafter described. The feed chute is supported on the top frame 11 and the veneer stock 15, which has its edges thin or sharpened, as shown in Fig. 5, is fed preferably in the form of meeting strips laid one upon the other with the flat sides together, as shown in Fig. 1. Obviously the machine will operate by feeding one strip or a greater number of strips and the pick when cut is preferably as shown in Fig. 5 at 15$^a$, or it may be as shown at 15$^b$ in Fig. 15, or it may be of other shapes as desired. The strips of stock 15 usually come in rolls 16 which are preferably attached to and carried on spindles 17 and 18 which are mounted on brackets 19 and 20 on the top and back part of the machine. The stock is fed forward through the chute by means of the feed rollers 21 and 22 which are arranged one above the other, as shown in Fig. 9. The rollers are geared together as shown at 23 and are mounted in brackets 24, while the upper roller has a bearing box 25 carried by the eccentrics 26, each of which has a crank 27 and the cranks are connected by a link 28, while the boxes are pressed down snugly upon eccentrics 26 by springs 29.

It will be seen that by pushing the link 28 on the cranks in one direction the springs 29 will force the upper roller 22 downward snug upon the stock, while by reversing the movement, the eccentrics will lift the roller to allow the stock to be slipped freely through and adjusted.

All of the foregoing is common to machines of this general type, but I have illustrated and described it simply to make the operations of the machine clear. The main invention lies in the cutting mechanism and the means for adjusting said mechanism.

The feed rollers can be driven in any convenient way, but I have shown the lower roller provided with a gear wheel 30 which meshes with a gear 31 on the vertical shaft 32, and the latter connects by gears 33 and 34 with the main driving shaft 35 which is arranged transversely in the top frame 11 and has the driving pulley 36 and the balance wheel 37. The driving pulley 36 is preferably a clutch pulley, so that the machine can be quickly stopped or started, and is operated by the mechanism 38 for which no novelty is claimed and which is not described in detail. The shaft 35 also drives by means of gear wheels 39 and 40 (see Fig. 6), the shaft 41 which is arranged longitudinally of the machine and parallel with the feed, this shaft carrying an eccentric 42 which in turn carries a vertical moving head block 43 this being held to slide in a vertical way in the head 14 and the block is held in place by a suitable faceplate 44. The sliding block 43 carries the cutting off knife 45 which slides across the knife block 46 so that the stock which is fed forward through the opening 13 and over the knife block 46 is severed into tooth picks by the knife 45.

If the head 14 were stationary it will be seen that the tooth picks cut would be of the same size at both ends, but the trade calls for tooth picks wider at one end than at the other and so I provide for oscillating the head 14 so the knife will descend first when the head is held at one angle to the feed and next, when the head is arranged at the opposite angle, and so picks of the desired kind are cut. To provide for this easy oscillation and to hold the feed chute in right relation to the head always, the end of chute 12 is preferably rounded as shown at 12ᵃ in Fig. 8.

It is not broadly new to have the cutting-off arrangement oscillate in relation to the stock but I provide a very simple means for getting the desired oscillation and holding the parts in right relation and in steady position during the cutting process. To this end the head 14 has trunnions 47 and 48 machine frame, and the lower trunnion is at top and bottom, each journaled in the provided with a curved arm 49 (see Figs. 4 and 6) which extends rearward underneath the top of the frame 10 and which, at its rear end, is provided with several holes 50, adapted to receive bolts 52 by means of which, together with the link 51, the arm 49 can connect with the oscillating lever 53, which has holes 50ᵃ corresponding to holes 50, and likewise adapted to receive bolts 52. It will be seen that by shifting the position of the link 51 and bolts 52, the arm 49 may be given a longer or shorter stroke and the oscillations of the head 14 thus regulated. The lever 53 is fulcrumed on the stud 54 and has a forked free end 55 which carries rolls 56 operating against the cam 57 on the stud 58, and the latter connects by gears 59 and 60 with the vertical shaft 32 already referred to, and it will be seen that it is only a matter of having the geared parts properly timed to insure making the pick of proper shape and having the knife 45 descend at the end of an oscillation. It will be noticed that by having the knife maintained in a head arranged to oscillate as shown, I get a very steady and positive motion and the picks can therefore be cut smoothly and of perfect shape.

It is found desirable to slightly round the pick ends, as shown in Fig. 15, and to provide for this I use the attachment shown in Figs. 10 to 12. As here illustrated, the knife plates 61 are secured to the block 43 at the ends of the knife 45 so that the cutting extension 62 which has the desired shape to round the tooth pick ends, shall register with the ends of the knife 45, but the die or knife block 63 must be arranged below the knives 62 in order to form a bearing for the stock, but as this would interfere with the knife 45, provision has to be made for cutting or shaping the stock at the ends coincident with the pick ends before the knife 45 cuts the stock off, consequently I use a die 63 over the ends of which the knife extensions or end knives 62 slide, and this is mounted in a head 64 which reciprocates vertically and is carried by a vertically moving plunger 65 which connects by means of the joint 65ᵇ (see Fig. 12) with the arm 65ᵃ which is oscillated by the mechanism described below. The joint 65ᵇ is necessary because the head 14 must oscillate while the plunger 65 moves. The arm 65ᵃ has rollers 66 working in the cam slot 67 of the plate 68 which has an extension 69 sliding transversely in bearings 71. The reciprocation of the plate 68 can be effected in any convenient way, but I have shown one of the said extensions connected by the link 71 with a lever 72 which has a fulcrum as shown at 73 on the bracket 74. The short end of the lever 72 carries the wheel 75 working in a cam groove 76 of the disk 77, and the latter is carried by the vertical shaft 32 already referred to. It will thus be seen that the rotation of the cam disk 77 will slide the plate 68 and cause the vertical reciprocation of the plunger 65, and these parts are timed so that the plunger will be in its highest position just as the knives 62 descend and just before the knife 45 reaches the knife block 46, at which latter point the plunger will have descended sufficiently to withdraw the block 63 and leave the block 46 free for the action of the knife 45.

From the foregoing description it will be seen that I have made a very practical and reliable machine for cutting tooth picks of the kinds and the general way mentioned, and it will be understood that the mechanism for imparting motion to the various parts can be changed without departing from the principle of the invention, the essential feature of which lies in the cutting mechanism and oscillating head, the means for oscillating it and the means for rounding the ends of the picks.

I claim:—

1. A toothpick machine comprising a head journaled at top and bottom, a toothpick cutting mechanism carried by and traveling in the head, means for feeding stock to the cutting mechanism, an arm rigidly connected with the head, means for driving the arm to oscillate it, and an adjustable connection between the arm and its driving mechanism regulating the degree of oscillation of the arm.

2. A tooth pick machine comprising an oscillating head, a reciprocating cutter operating in the head, auxiliary knives arranged at the ends of the main cutter, a knife block or die for the auxiliary knives, and means for reciprocating the said knife block or die.

3. A tooth pick machine comprising a cutter head, a reciprocating main cutter on the head, auxiliary knives at the ends of the main cutter, a knife block to support the stock against the auxiliary knives, and means for removing the knife block before the main cutter reaches the stock.

4. A tooth pick machine comprising a reciprocating cutter, a stock feed delivering stock below the cutter, auxiliary knives extending below the ends of the main cutter, a knife block to support the stock against the auxiliary knives, and means for removing the knife block before the main cutter reaches the stock.

5. A tooth pick machine comprising a reciprocating cutter, a stock feed delivering stock below the cutter, auxiliary knives at the ends of the cutter, a vertically reciprocating plunger, and a knife block carried by the plunger and adapted to support the stock against the auxiliary knives.

WILLIAM H. PARKER.

Witnesses:
 FRANK GIMEL,
 HARRY JONES.

Copies of this patent may be obtained for five cents each, by addressing the "Commissioner of Patents, Washington, D. C."